Jan. 12, 1937.    E. J. ROCHER    2,067,546
ROAD VEHICLE
Filed Jan. 10, 1936
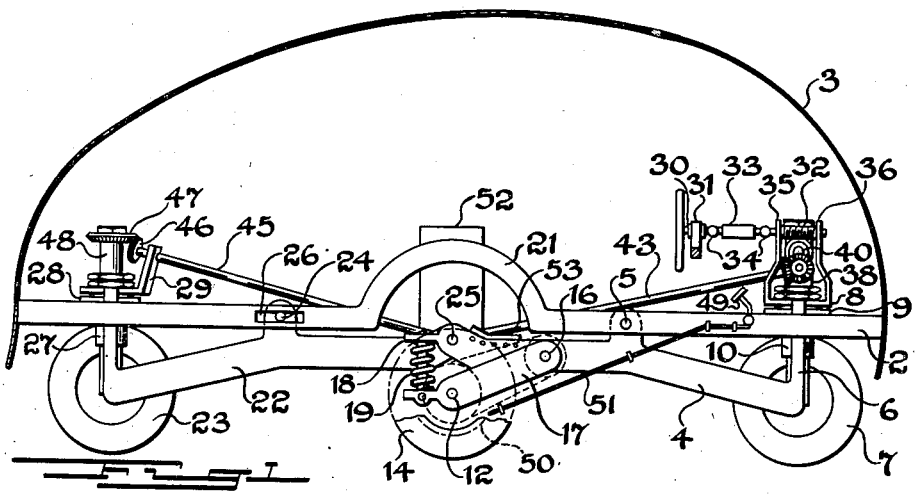
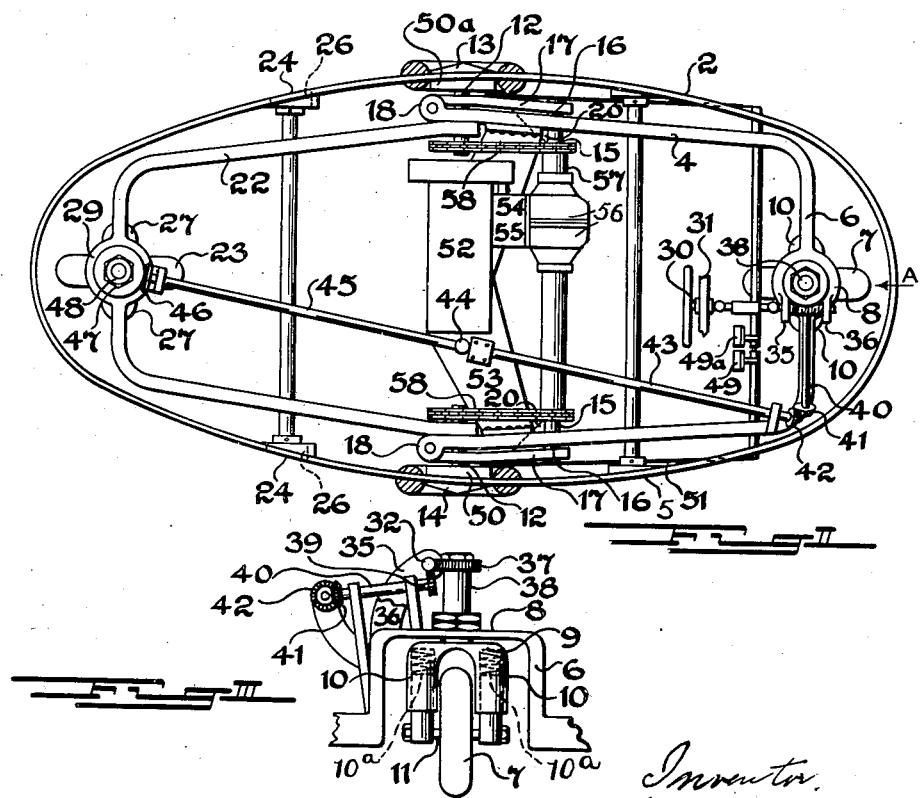

Patented Jan. 12, 1937

2,067,546

UNITED STATES PATENT OFFICE 2,067,546

ROAD VEHICLE

Etienne Jean Rocher, Johannesburg, Union of South Africa

Application January 10, 1936, Serial No. 58,591 In Great Britain January 19, 1935

7 Claims. (Cl. 180—21)

The present invention relates to road vehicles, particularly motor vehicles, having four wheels arranged in diamond formation, that is one at each end in the central longitudinal axis of the vehicle and two on a transverse axle between the front and rear wheels.

According to the invention there is provided a rigid body frame carrying or forming part of the body and at least one sub-frame carrying the axle and one end wheel and pivoted to the body frame at a transverse axis between said axle and said wheel, whereby it can rock in a vertical plane. Preferably there are two such sub-frames articulated to one another at their adjacent ends.

A form of the invention suitable for a motor driven conveyance is shown in the accompanying drawing in which:

Figure I is an elevation, and

Figure II is a plan.

Figure III is a detail view seen from the direction of arrow A in Figure II.

2 indicates the body frame, carrying or forming part of the body 3. 4 is a sub-frame pivoted to the body frame at a transverse axis 5. At one end said sub-frame is arched upward at 6 to receive a single wheel 7. The summit of the arch is widened to form the non-rotating member 8 of a wide thrust bearing against which the rotating member 9 bears. Member 9 is itself the summit of a fork comprising two telescopic spring legs 10 between which the wheel 7 is positioned by means of its axle 11 fixed to the lower ends of said legs. Springs 10a are provided within the telescopic legs and are arranged for compression between the summit of the fork and the lower ends of said legs.

The sub-frame 4 carries at its rear end the axles 12, 12 on the ends of which are mounted the wheels 13, 14. The axles 12, 12 are preferably mounted on the sub-frame by a spring connection. This, as shown, consists of the transverse rod 15 pivoted on the sub-frame at 16, 16 and having rigidly attached to its ends the arms 17, 17. Extensions 18, 18 are provided on the sub-frame; between which and the arms 17, 17 are inserted the compression springs 19, 19. The arms 17, 17 are braced to the rod 15 against lateral deformation by gusset ties 20, 20. Each side of the body frame is arched at 21 to permit free up and down movement of the sub-frame and its attached axles and wheels.

In the example shown there is a second sub-frame 22 carrying the second end wheel 23. It is pivoted to the body frame at 24, and to the sub-frame 4 at 25, the two sub-frames forming an articulated chassis supporting the body frame at 24 and 5. One of the pivot axes 24, 25 is arranged for longitudinal sliding movement to allow for the angular movement of the sub-frames; the pivot axis 24 being shown for this purpose arranged to slide in slots 26 in the body frame. The wheel 23 is, like the wheel 7, mounted in a spring fork 27 attached to the sub-frame by a thrust bearing 28, 29.

The effect of the suspension structure described is to lessen the transmission of shocks from the wheels to the body frame. In particular, when one of the end wheels or the pair of middle wheels is raised by passing over an obstruction, the affected point 5 or 24 of attachment of the sub-frame to the body frame canot be raised by more than a fraction of the rise of said wheel or wheels.

Both the wheels 7 and 23 are steering wheels. They are coupled to turn tangentially to a common arc by mechanism such as is shown. This includes the steering wheel spindle 30 rotatable in a frame member 31 and connected to a worm 32, the telescopic shaft 33 having universal joints 34 at its end. This construction allows for the play between the body frame and the chassis.

The worm 32 is rotatably mounted in brackets 35 and 36 extending upwardly from the arch 6 and engages the worm wheel 37 fast on the spindle 38 rising rigidly from the fork 9, 10, 10.

The worm 32 also engages a worm-wheel 39 mounted on shaft 40 to drive the bevel wheels 41, 42. The latter is mounted on a shaft 43 connected by a universal joint 44 to a similar shaft 45 connected by bevel wheels 46, 47 to the spindle 48 of the spring fork 27. The centre of movement of the universal joint 44 is in line with the two pivots 25, whereby relative movement of the sub-frames 4 and 22 does not affect the operation of the mechanism coupling the front and rear wheels.

In the case of an animal-drawn vehicle or a trailer, steering gear indicated by numerals 30 to 34 is omitted; but a coupling connection between the wheels 7 and 23, which passes through the point 44 in line with the pivots 25, is retained.

The transference of the braking motion from the brake actuating part of the brake apparatus such as the pedal 49 (Figure I) to the point of the brake apparatus on the chassis, such as the brake band 50, is conveniently effected by Bowden cable mechanism 51. The wheel arrangement and the steering at both ends, permit the vehicle to be turned within an unusually short radius; and to facilitate this it is preferred to provide independent braking for each side wheel 13, 14. Such an arrangement is shown in Figure II, in which pedal 49 is connected by 51 only to the brake band 50 of wheel 14; while a further pedal 49a is connected by Bowden cable 51a to brake band 50a of wheel 13.

The engine 52 may be mounted on the chassis frame 4; preferably transversely thereto and over the axle 12. It is shown as supported on plate 53 on the inner ends of the frames 4. It drives through a clutch, gear box and differential indicated by 54, 55, 56 onto hollow shafts 57 external to and coaxial with the rod 15. Said shafts 57 are connected by sprocket and chain mechanisms 58, 58 to the two ends of the axle 12, which is divided to permit the two wheels 13 and 14 to rotate at different angular speeds.

I claim:

1. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, and a second sub-frame on which the second end wheel is mounted, said second sub-frame being pivotally attached at transverse axes to the body frame and the first sub-frame respectively, one of such pivotal attachments permitting sliding movement longitudinally of the vehicle.

2. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, a second sub-frame on which the second end wheel is mounted, said second sub-frame being pivotally attached at transverse axes to the body frame and the first sub-frame respectively, one of such pivotal attachments permitting sliding movement longitudinally of the vehicle, steering means for both end wheels comprising a steering wheel mounted on the body frame and connected to one of the end wheels to steer the latter, and a rotary connection connecting the end wheels including a universal joint the centre of movement of which is in the pivotal axis at which the two sub-frames are connected.

3. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, a second sub-frame on which the second end wheel is mounted, said second sub-frame being pivotally attached at transverse axes to the body frame and the first sub-frame respectively, one of such pivotal attachments permitting sliding movement longitudinally of the vehicle, and an engine mounted on one sub-frame and connected through a differential with the two ends of said axle which are separate to permit the wheels at the ends of said axle to have different angular velocities.

4. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, a second sub-frame on which the second end wheel is mounted, said second sub-frame being pivotally attached at transverse axes to the body frame and the first sub-frame respectively, one of such pivotal attachments permitting sliding movement longitudinally of the vehicle, steering means for both end wheels comprising a steering wheel mounted on the body frame and connected to one of the end wheels to steer the latter, a rotary connection connecting the end wheels including a universal joint the centre of movement of which is in the pivotal axis at which the two sub-frames are connected, an engine being mounted on one sub-frame and connected through a differential with the two ends of the axle, which are separate to permit their wheels to have different angular velocities.

5. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, arms connecting said axle to its sub-frame pivotally attached to the latter on a common axis and controlled as to the angular position relatively to the sub-frame by spring means, an engine mounted on the sub-frame and connected through a differential with a pair of shafts co-axial with the arm pivots, and driving connections between said respective shafts and the ends of the axle.

6. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, a second sub-frame on which the second end wheel is mounted, said second sub-frame being pivotally attached at transverse axes to the body frame and the first sub-frame respectively, one of such pivotal attachments permitting sliding movement longitudinally of the vehicle, arms connecting said axle to its sub-frame pivotally attached to the latter on a common axis and controlled as to their angular position relatively to the sub-frame by spring means, an engine mounted on the sub-frame and connected through a differential with a pair of shafts co-axial with the arm pivots, and driving connections between said respective shafts and the ends of the axle.

7. A road vehicle comprising a transverse axle and four wheels arranged in diamond formation, one at each end and two on said transverse axle which is positioned between the end wheels, said vehicle further comprising a body frame, a sub-frame carrying at its ends the axle and one end wheel and pivoted to the body frame at a transverse axis between said axle and said wheel, a second sub-frame on which the second end wheel is mounted, said second sub-frame being pivotally attached at transverse axes to the body frame and the first sub-frame respectively, one of such pivotal attachments permitting sliding movement longitudinally of the vehicle, steering means for both end wheels comprising a steering wheel mounted on the body frame and connected to one of the end wheels to steer the latter, a rotary connection connecting the end wheels including a universal joint the centre of movement of which is in the pivotal axis at which the two sub-frames are connected, arms connecting said axle to its sub-frame pivotally attached to the latter on a common axis and controlled as to their angular position relatively to the sub-frame by spring means, an engine mounted on one sub-frame and connected through a differential with a pair of shafts co-axial with the arm pivots, and driving connections between said respective shafts and the ends of the axle.

ETIENNE JEAN ROCHER.